United States Patent [19]

Tarcy

[11] Patent Number: 4,842,964
[45] Date of Patent: Jun. 27, 1989

[54] IN-SITU ELECTROLYTE STORAGE FOR BATTERIES

[75] Inventor: Gary P. Tarcy, Plum Borough, Pa.

[73] Assignee: Aluminum Company of America, Pittsburgh, Pa.

[21] Appl. No.: 171,280

[22] Filed: Mar. 21, 1988

[51] Int. Cl.[4] .................. H01M 10/44; H01M 6/36
[52] U.S. Cl. ................................ 429/52; 429/113; 429/116
[58] Field of Search ................. 429/52, 113, 116

[56] References Cited

U.S. PATENT DOCUMENTS

| 3,525,639 | 8/1970 | Redmon | 429/113 |
| 3,649,363 | 3/1972 | Morehouse et al. | 429/116 X |
| 3,894,888 | 7/1975 | Gou | 429/116 X |
| 4,684,586 | 8/1987 | Haskins et al. | 429/116 X |

Primary Examiner—Stephen J. Kalafut
Attorney, Agent, or Firm—Douglas G. Glantz; Arnold B. Silverman

[57] ABSTRACT

The present invention provides in-situ electrolyte storage for batteries. The size of the reserve battery is significantly smaller due to the placement of an elastomeric sealed container within the interelectrode space of the battery. The sealed container contains the electrolyte. When punctured, the electrolyte flows out of the sealed container and into the electrode space. Substantially simultaneously, the elastomeric sealed container shrinks back allowing the electrolyte to flow into the interelectrode space allowing for the reaction. Preferably, the sealed container is made of elastomeric material that is flexible yet with good memory. This will allow the sealed container to shrink back to a small size when punctured. In addition, the sealed container should have have a low permeability to the electrolyte so as to minimize the amount of electrolyte that escapes from the sealed container while the electrolyte is being stored.

12 Claims, 2 Drawing Sheets 4,842,964

IN-SITU ELECTROLYTE STORAGE FOR BATTERIES

BACKGROUND OF THE INVENTION

1. Field of the Invention

This invention relates to in-situ storage of electrolyte for batteries, especially as applied to ambient temperature reserve batteries.

2. Description of the Prior Art

Electrolyte is typically stored outside of the battery cavity in most reserve batteries, so as to prevent leakage of the electrolyte to the vicinity of the anode and cathode prior to use. This location of electrolyte outside of the battery itself requires that the battery size be large in order to accommodate the electrolyte storage.

There remains a need for a compact battery that provides storage of the electrolyte within the battery housing and separate from the battery electrodes. This need is especially critical in cases where the electrolyte can degrade other components of the battery.

SUMMARY OF THE PRESENT INVENTION

The present invention has met the above described needs by providing in-situ electrolyte storage for batteries. The size of the reserve battery is relatively smaller than prior art reserve batteries due to the placement of a sealed container, preferably having a flexible wall within the interelectrode space of the battery. The sealed container contains the electrolyte. When the sealed container is punctured by the user prior to use, the electrolyte flows out of the sealed container and into the interelectrode space. Substantially simultaneously the sealed container shrinks, allowing the electrolyte to flow into the interelectrode space activating the anode-cathode reaction. Preferably, the sealed container is made of elastomeric material that is flexible yet with good memory. This will allow the sealed container to shrink back to a small size when punctured. In addition, the sealed container should have a low permeability so as to resist escape of electrolyte from the sealed container while the electrolyte is being stored.

It is an object of the present invention to provide in-situ electrolyte storage for reserve batteries.

It is a further object of the present invention to provide such a battery of reduced size as compared with other batteries of this type.

It is another object of the present invention to provide a sealed container which contains the electrolyte and preferably having a flexible wall composed of a material having a good memory.

It is an object of the present invention to provide a sealed container containing electrolyte and disposed in the interelectrode space of the reserve battery.

It is a further object of the present invention to provide a puncturing means for puncturing the sealed container, thereby flooding the interelectrode space with electrolyte.

It is yet another object of the present invention to provide a method of in-situ electrolyte storage.

It is yet a further object of the present invention to provide an in-situ electrolyte storage of a battery that provides long-term storage with minimal loss of electrolyte by either vaporization or chemical reaction.

It is an object of the present invention to provide a method of providing long term, in-situ storage of electrolyte in a reserve battery.

These and other objects of the present invention will be more fully understood from the following description of the invention on reference to the illustrations appended hereto.

DESCRIPTION OF THE PREFERRED EMBODIMENTS

The present invention relates to batteries and more specifically, to reserve batteries. It is preferred that reserve batteries have virtually extremely long shelf life. The prior art reserve batteries usually have electrolyte stored outside of the battery housing. The electrolyte storage area and battery are separated, usually by a separating means such as a diaphragm-like device. When the battery is used, the electrolyte then is forced into the battery housing by various means such as pressure. The presence of the electrolyte stored outside of the battery housing increases the size of the reserve battery by about two or three times.

Figure 1:
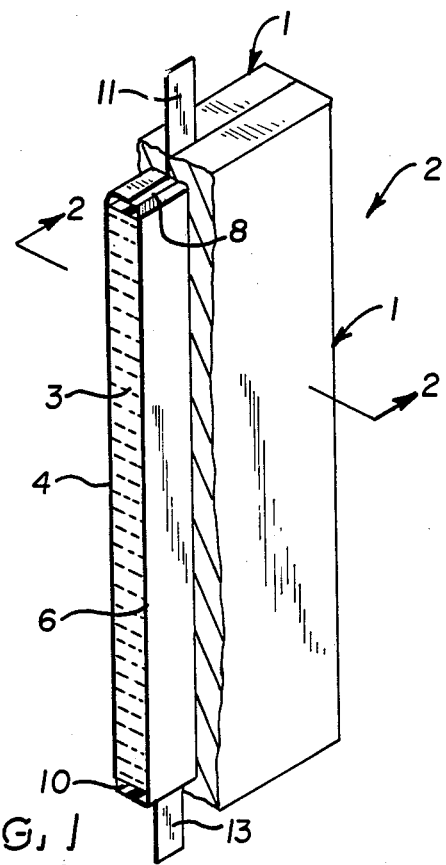
FIG. 1 is an isometric illustration partially in section of a reserve battery of the present invention.

The present invention provides for in-situ storage of electrolyte in a battery. Referring now to the FIGS. 1 through 3, the battery 2 consists of a housing 1, an anode 4 disposed within the housing 1. Preferably, the anode is composed of an aluminum base anode. A cathode 6 is disposed within the housing 1, in a generally spaced relationship to the anode 4. Preferably, the cathode 6 is generally parallel to the anode 4. The cathode 6 is preferably an air cathode.

The battery housing 1 may be preferably sealed. The presence of the spaced relationship between the anode 4 and cathode 6 creates an interelectrode space 12 (FIG. 2) within which electrolyte 3 (FIG. 1) is disposed. In one aspect, separator means 8, 10 may maintain a predetermined spacing between the anode 4 and cathode 6.

The sealed container 14 which in the form shown is disposed within the housing 1 may be made of a butyl rubber elastomer having an unexpanded wall thickness of about 0.5 mm. Container 14 may contain electrolyte, such as 4N NaOH and 0.06N sodium stannate, for example. This embodiment showed a 0.74 percent weight increase in the electrolyte per year of storage. The weight increase will come from adsorption of carbon dioxide and water from the atmosphere. Alternatively, the sealed container may contain deionized water with the electrolyte materials such as the sodium hydroxide and sodium stannate may be stored within the interelectrode space 12 but outside of the sealed container. When activated, the water in the sealed container will flood the chamber and mix with the electrolyte materials to form electrolyte. This alternative embodiment showed a 2 percent weight decrease per year with the weight decrease probably due to water vapor loss from the sealed container.

Figure 2:
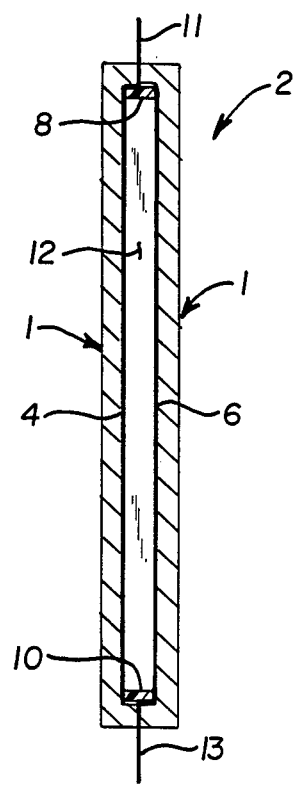
FIG. 2 is a sectional illustration taken along lines 2—2 of FIG. 1 (with the electrolyte removed) of a reserve battery of the present invention.

The separator means 8, 10 are disposed between the anode 4 and cathode 6 in a relatively spaced relationship. Preferably the separator means 8, 10 are in a spaced relationship and preferably are generally parallel to each other. The separator means 8, 10, anode 4, and cathode 6 define an interelectrode space 12 (FIG. 2).

A pair of electrically conductive tabs 11, 13 are connected respectively to anode 4 and cathode 6 for electrical connections. A sealed container 14 (FIG. 3) is disposed within the interelectrode space 12. The sealed container 14 contains the electrolyte 3. The sealed container 14 should preferably be composed of an elastomeric material of low permeability to vapors. The sealed container 16 should be filled with sufficient electrolyte 3 to activate the battery and when in this expanded state should be easily puncturable. The elastomeric material of sealed container 14 should have good memory so that after the sealed container is punctured, the elastomeric sealed container 14 will shrink back into minimal space.

The presence of electrolyte in the interelectrode space 12 prior to activation may reduce the activity and therefore, the power of the battery when activated. The sealed container 14 material should be of low permeability to electrolyte, so as to minimize the escape of electrolyte into the interelectrode space 12. The elastomeric material should be chemically inert with respect to the electrolyte material.

Figure 4:
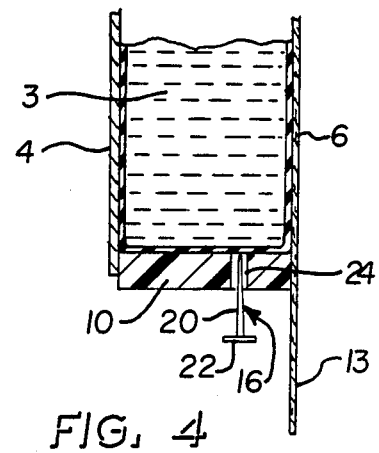
FIG. 4 is an enlarged sectional illustration of a reserve battery of the present invention.

As shown in FIG. 4, disposed along the wall of the separator means 10 is an activating pin or puncturing means 16. When the battery is desired to be used, the puncturing means 16 is inserted into and pierces the elastomeric sealed container 16, thereby puncturing the sealed container 14. Preferably, the puncturing means may be a needle. The puncturing means 16 may be disposed in the separator 10 by passing it through a septum (not shown in FIG. 1). Alternatively, the puncturing means 16 may be inserted through the housing.

Figure 3:
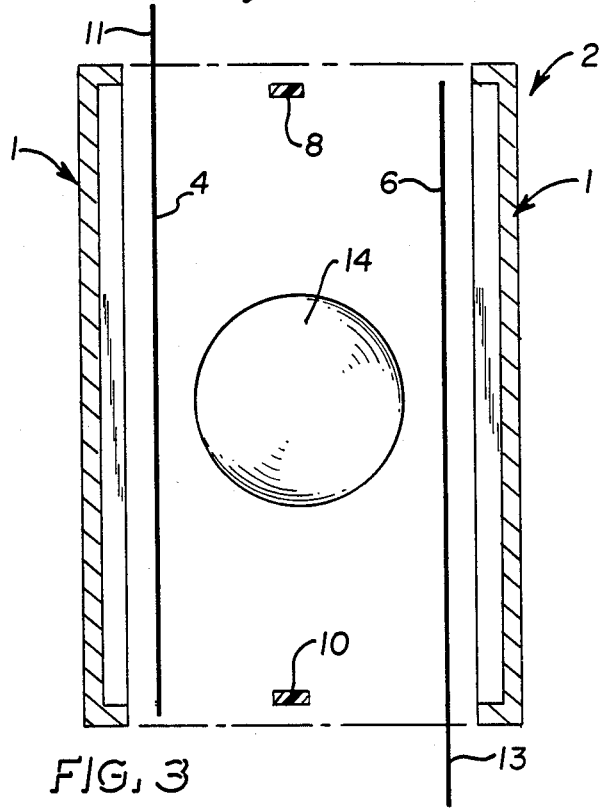
FIG. 3 is an exploded illustration partially in section of a reserve battery means of the present invention prior to release of the electrolyte.

FIG. 4 shows a cross-sectional illustration of separator means 10. Puncturing means 16 have a shaft 20 and a head 22. Puncturing means 16 are preferably disposed within separator means 10 through a septum 24. When activation of the battery is desired, the head 22 of puncturing means 16 is pressed, pushing the puncturing means 16 into the interelectrode space 12 (FIG. 2) and into the wall of the sealed container 14 (FIGS. 3 and 4).

Referring again to FIGS. 1 and 2, once the sealed container 14 is freed electrolyte 3 floods the interelectrode space 12. Substantially simultaneously, the elastomeric sealed container 14 collapses to its original shape prior to being filled with electrolyte. Preferably, the sealed container 14 shrinks back to less than about 10% of the volume of its size when expanded with electrolyte.

Figure 5:
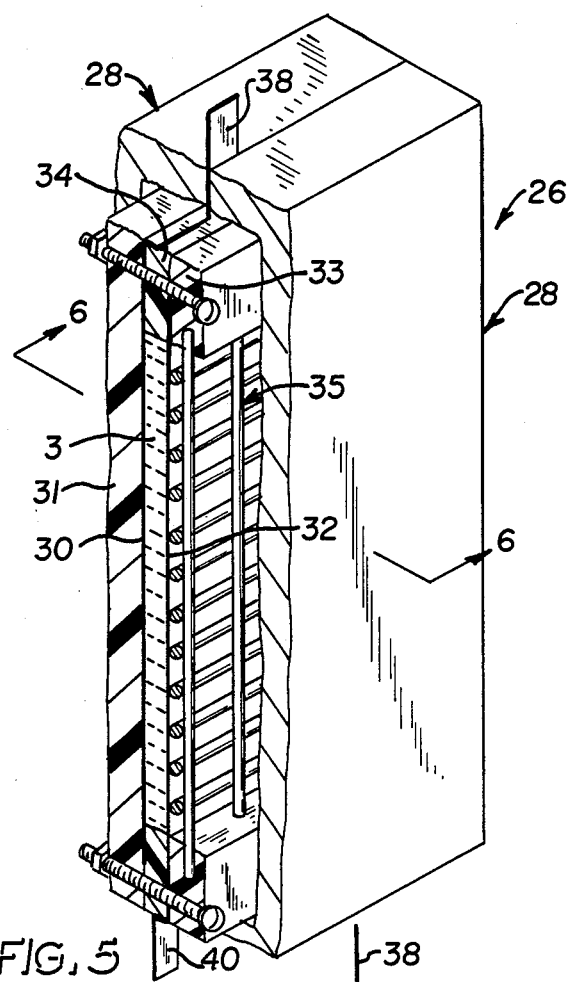
FIG. 5 is an isometric illustration partially in section of a reserve battery of the present invention.
Figure 6:
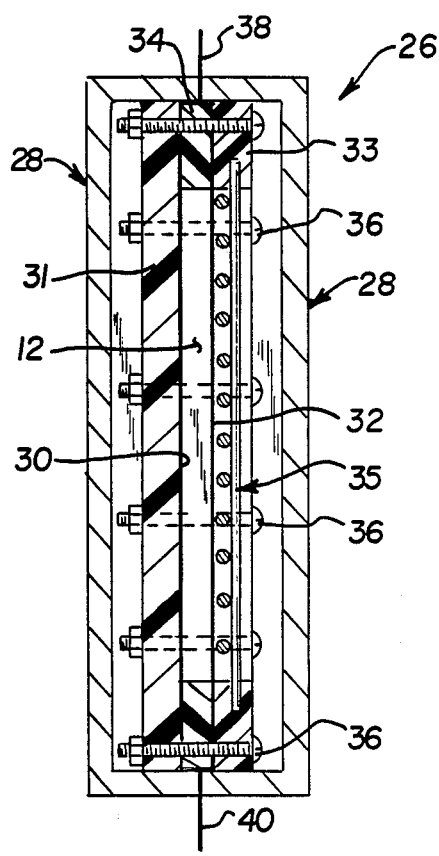
FIG. 6 is a sectional illustration taken along lines 6—6 of FIG. 5 (with the electrolyte removed).
Figure 7:
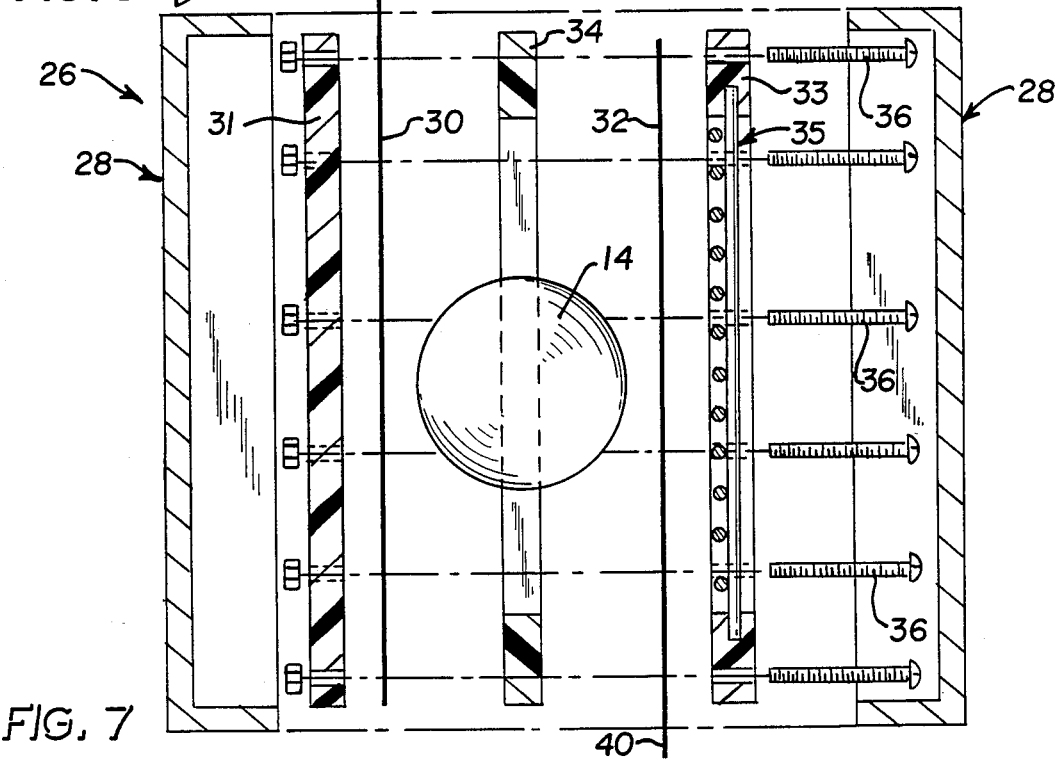
FIG. 7 is an exploded illustration partially in section of a reserve battery means of the present invention.

In a preferred embodiment shown in FIGS. 5-7, the battery 26 consists of a housing 28, an anode 30 and its associated separator 31 disposed within the housing 28. A cathode 32 is disposed within the housing 28 in a generally spaced relationship to the anode 30. Electrically conductive tabs 38, 40 are, respectively, connected to anode 30 and cathode 32. The support frame 33 has grid 35. The anode 30 is composed of an aluminum base alloy which is secured on a frame (not shown) such as plexiglass by means of silicone rubber cement or tape. An electrode separator 34 may be disposed between the anode 30 and cathode 32. The electrode separator 34 may preferably be about 0.5 cm thick. The electrode separator 34 is preferably generally parallel to the anode and cathode. In one aspect a cathode support frame (not shown) may be placed behind the electrode 32. The anode-cathode assembly may advantageously be secured by mechanical fasteners such as bolts 36 and the associated nuts.

When an aluminum-air battery is used, it is preferred that the electrolyte be either caustic or saline. Caustic electrolytes may be sodium hydroxide, potassium hydroxide and the like. It is preferred that the caustic solution be about 4M or greater.

In an alternate embodiment, the battery may be composed of flexible materials. A piston (not shown) may be used to compress the battery housing, thereby allowing the elastomeric sealed container to burst, shrink back, and allow the electrolyte to flood the interelectrode space.

It will be appreciated that the present invention provides a compact reserve battery with long-term storage capabilities. The reserve battery has a housing. An anode and a cathode are both disposed within the housing. The anode and cathode are in a relative spaced relationship within the housing, thereby creating an interelectrode space. The battery contains an elastomeric sealed container which contains electrolyte and is disposed within the interelectrode space. When it is desired for the battery to be activated, puncturing means pierce the sealed container. The sealed container collapses to its original size and causes the electrolyte to flood the interelectrode space.

The present invention also discloses a method of providing long-term in-situ storage of electrolyte in a reserve battery. The reserve battery discussed hereinbefore is provided. The sealed container is punctured by puncturing means to release the electrolyte contained therein. The sealed container shrinks when the electrolyte floods the interelectrode space.

Whereas particular embodiments of the present invention have been described above for purposes of illustration, it will be evident to those skilled in the art that numerous variations of the details may be made without departing from the invention as defined in the appended claims.

I claim:

1. A reserve battery which has long-term in-situ storage of electrolyte including a housing, an anode, a cathode, said anode and said cathode being disposed in relative spaced relationship within said housing, an interelectrode space being defined by said anode and cathode, wherein the improvement comprises a sealed container composed of an elastomeric material;

said sealed container being disposed in said housing;

said sealed container containing a sufficient amount of electrolyte to effect activation of said battery when brought into contact with said anode and said cathode; and fracturing means for releasing said electrolyte from said sealed container, whereby when said fracturing means breaks said sealed container electrolyte floods said interelectrode space.

2. The reserve battery of claim 1, wherein said sealed container is composed of a material having low permeability to said electrolyte and good memory.

3. The reserve battery of claim 1, wherein said battery has electrode separator means disposed between said anode and said cathode.

4. The reserve battery of claim 1, wherein said anode is composed of an aluminum base alloy.

5. The reserve battery of claim 1, wherein said cathode is an air cathode.

6. The reserve battery of claim 1, wherein said sealed container, after fracture, collapses to less than about 10% of the volume of its expanded size.

7. The reserve battery of claim 6, wherein said sealed container is composed of a material that is chemically inert with respect to the electrolyte.

8. The reserve battery of claim 6, including said container being composed of rubber.

9. A method of providing a long-term, in-situ storage and release of electrolyte within a reserve battery comprising providing a housing, an anode and a cathode disposed therein;

providing said anode and said cathode in a relatively spaced relationship within said housing to define an interelectrode space;

providing an elastomeric sealed container disposed within the space between said anode and said cathode and containing an effective amount of electrolyte;

providing fracturing means for releasing said electrolyte from said sealed container;

fracturing said sealed container to release said electrolyte; and allowing said sealed container to shrink when said electrolyte floods the space.

10. The method of claim 9, including positioning separator means disposed within said housing and between said anode and cathode.

11. The method of claim 9 including employing an aluminum base anode as said anode.

12. The methode of claim 11 including employing an air electrode as said cathode.

* * * * *